(12) United States Patent
Suzuki

(10) Patent No.: US 6,430,278 B1
(45) Date of Patent: Aug. 6, 2002

(54) SYSTEM AND DEVICE FOR DETECTING SUBSCRIBER'S BUSY HOUR

(75) Inventor: Noboru Suzuki, Tokyo (JP)

(73) Assignee: NEC Corporation, Tokyo (JP)

( * ) Notice: Subject to any disclaimer, the term of this patent is extended or adjusted under 35 U.S.C. 154(b) by 239 days.

(21) Appl. No.: 09/580,650

(22) Filed: May 30, 2000

(30) Foreign Application Priority Data

May 31, 1999 (JP) .......................................... 11-153148

(51) Int. Cl.[7] .............................................. H04M 15/00
(52) U.S. Cl. .................. 379/133; 379/111; 379/112.03; 379/112.04; 379/134
(58) Field of Search ............... 379/111, 112.01–112.06, 379/133–134, 221.03

(56) References Cited

U.S. PATENT DOCUMENTS

| | | | |
|---|---|---|---|
| 3,835,257 A | * | 9/1974 | McLaughlin |
| 4,696,029 A | * | 9/1987 | Cohen |
| 5,659,593 A | * | 8/1997 | Tzvieli |
| 5,684,868 A | * | 11/1997 | Alexander |
| 5,768,284 A | * | 6/1998 | Cox |
| 5,946,375 A | * | 8/1999 | Pattison et al. |
| 5,949,862 A | * | 9/1999 | Fukuzawa et al. |
| 6,011,838 A | * | 1/2000 | Cox |

* cited by examiner

Primary Examiner—Duc Nguyen
(74) Attorney, Agent, or Firm—Whitham, Curtis & Christofferson, P.C.

(57) ABSTRACT

The subscriber's busy hour detection system includes the steps of setting a first observation period with respect to each of a plurality of subscribers to be observed and comparing the number of calls of each subscriber stored in a first counter within a specific first time zone in the first observation period with a first threshold value set in advance to select a subscriber whose said number of calls exceeds said first threshold value as a target whose traffic in a second time zone shorter than said first time zone is to be observed, setting a second observation period after said first observation period with respect to each of said plurality of selected subscribers to be observed and comparing the number of calls of each subscriber stored in a second counter within specific said second time zone in the second observation period with a second threshold value set in advance to select a subscriber whose said number of calls exceeds said second threshold value as a target whose traffic in a third time zone shorter than said second time zone is to be observed, and setting a third observation period after said second observation period with respect to each of said plurality of selected subscribers to be observed and storing the number of calls of each subscriber within said third time zone in a third counter.

18 Claims, 12 Drawing Sheets

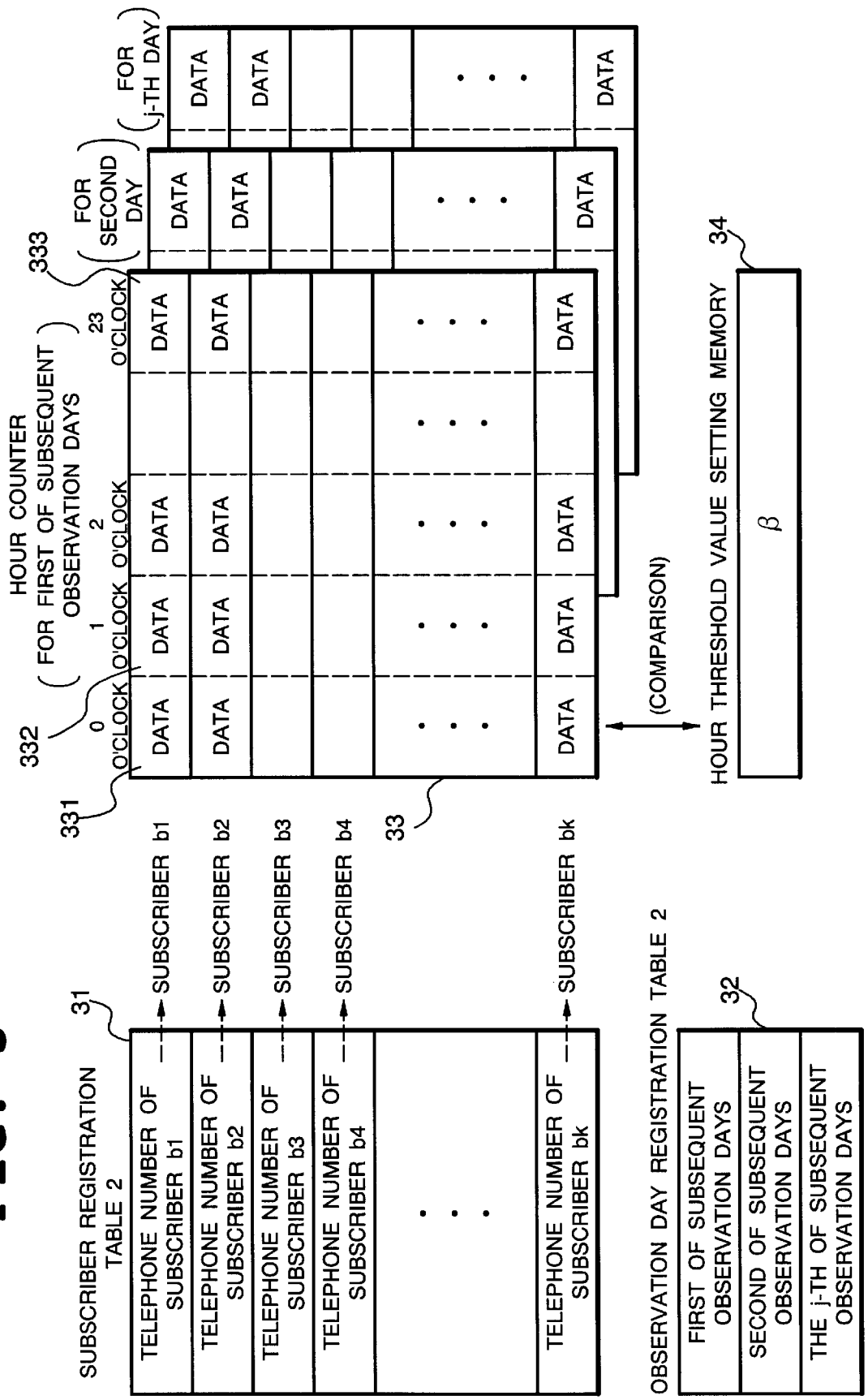

FIG. 4

SUBSCRIBER REGISTRATION TABLE 3  41

| TELEPHONE NUMBER OF SUBSCRIBER c1 | → SUBSCRIBER c1 |
| TELEPHONE NUMBER OF SUBSCRIBER c2 | → SUBSCRIBER c2 |
| TELEPHONE NUMBER OF SUBSCRIBER c3 | → SUBSCRIBER c3 |
| TELEPHONE NUMBER OF SUBSCRIBER c4 | → SUBSCRIBER c4 |
| ... | ... |
| TELEPHONE NUMBER OF SUBSCRIBER cl | → SUBSCRIBER cl |

OBSERVATION DAY REGISTRATION TABLE 3  42

| FIRST OF FURTHER SUBSEQUENT OBSERVATION DAYS |
| SECOND OF FURTHER SUBSEQUENT OBSERVATION DAYS |
| THE k-TH OF FURTHER SUBSEQUENT OBSERVATION DAYS |

FIVE-MINUTES COUNTER (FOR FIRST OF FURTHER SUBSEQUENT OBSERVATION DAYS)  43

431 — 432 — 433 (FOR SECOND DAY) / (FOR k-TH DAY)

| | 0 MINUTE | 5 MINUTES | ... | 50 MINUTES | 55 MINUTES |
|---|---|---|---|---|---|
| | DATA | DATA | | DATA | DATA |
| | DATA | DATA | | DATA | DATA |
| | ... | ... | ... | ... | ... |
| | DATA | DATA | | DATA | DATA |

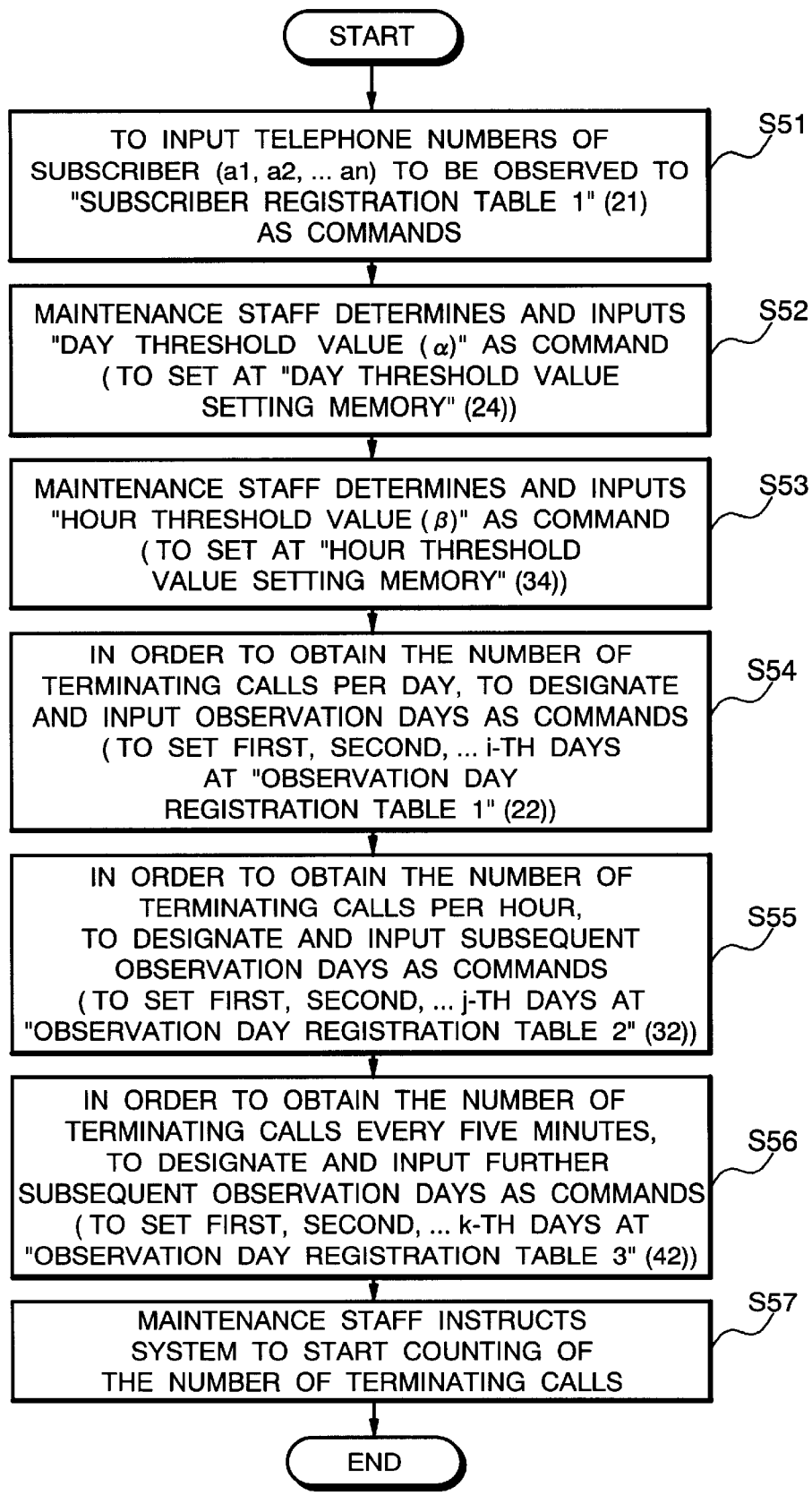

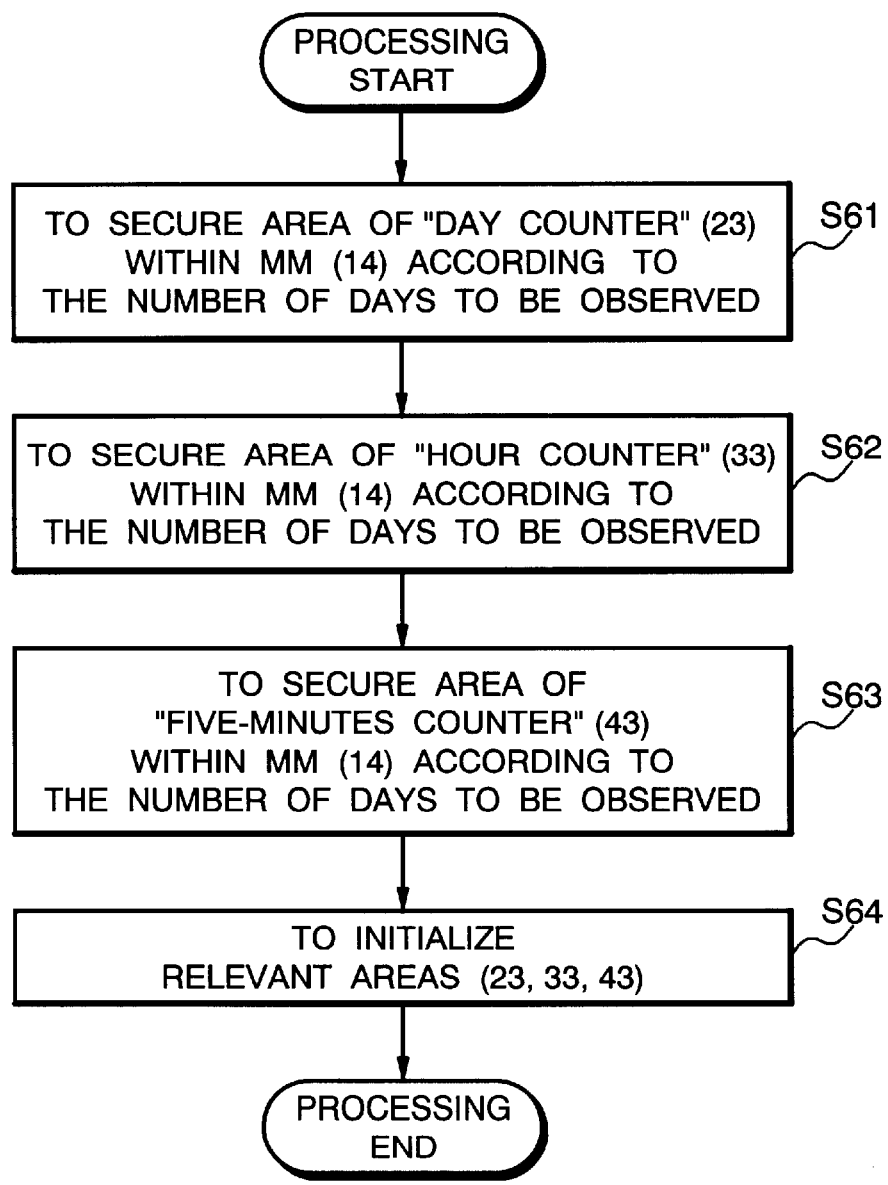

SYSTEM AND DEVICE FOR DETECTING SUBSCRIBER'S BUSY HOUR

BACKGROUND OF THE INVENTION

1. Field of the Invention

The present invention relates to subscriber's busy hour detection system and device and, more particularly, to subscriber's busy hour detection system and device for detecting a time when subscribers most frequently use communication lines in a telecommunication system.

2. Description of the Related Art

In a telecommunication system such as a telephone network, for the maintenance and management of the system, it is necessary to observe traffic (the amount or the number of calls) on a subscriber basis to know a time zone when subscribers most frequently use communication lines, that is, subscriber's busy hour (hereinafter, simply referred to as busy hour). In a case, for example, where a person in charge of maintenance should turn off a subscriber's control circuit accommodated in an electronic exchange for the purpose of maintenance, conducting such operation so as to prevent a subscriber's busy hour in advance enables effects of the operation on subscribers to be minimized.

Knowing such subscriber's busy hour as mentioned above is also indispensable for providing various kinds of services including subscriber's auditing service. By picking up subscribers whose calling rate of subscriber is high and collecting and considering their detailed data, for example, useful keys to the provision of various services can be obtained. It is therefore necessary to detect subscriber's busy hour by any method or other.

For detecting such subscriber's busy hour as described above, selecting as many subscribers to be observed as possible and observing their calling conditions at the same time is important in order to obtain more precise data. Selection of subscribers to be observed is conventionally the responsibility of a person conducting maintenance, and the maintenance staff arbitrarily selects a subscriber to be observed and observes the subscriber's calling condition.

Selecting too many subscribers to be observed, however, gives a burden on an electronic exchange to reduce its processing capacity, so that the number of subscribers to be observed which can be selected is as a matter of course limited.

In conventional subscriber's busy hour detection systems, because subscriber's busy hour is detected by observing the limited number of subscribers to be observed, it is difficult to obtain detailed data which reflects subscribers' patterns of behavior whose life style has been diversified in recent years.

More specifically, since subscribers' life styles used to be substantially uniform and within a day, subscriber's busy hour used to be substantially fixed (e.g. 10 o'clock in the morning and 2 o'clock in the afternoon), observing target subscribers could obtain approximately accurate results. Under such circumstances, busy hour could be handled uniformly for each subscriber.

However, in recent years when life style has been so diversified that a behavior pattern irrespective of day and night is not unusual, subscribers' behavior patterns can not be applied to a fixed time frame, which makes it impossible to handle busy hour of each subscriber uniformly that has been possible before. It is therefore demanded to detect subscriber's busy hour and obtain detailed data from a wider viewpoint.

SUMMARY OF THE INVENTION

An object of the present invention is, in view of the above-described situations, to provide subscriber's busy hour detection system and device enabling detailed data to be obtained which reflects subscribers' behavior patterns whose life styles have been diversified in recent years.

According to the first aspect of the invention, a subscriber's busy hour detection system for observing traffic of a subscriber of a communication line in a telecommunication system to detect a subscriber's busy hour, comprises a first step of setting a first observation period with respect to each of a plurality of subscribers to be observed and comparing the number of calls of each subscriber stored in a first counter within a specific first time zone in the first observation period with a first threshold value set in advance to select a subscriber whose the number of calls exceeds the first threshold value as a target whose traffic within a second time zone shorter than the first time zone is to be observed, a second step of setting a second observation period after the first observation period with respect to each of the plurality of selected subscribers to be observed and comparing the number of calls of each subscriber stored in a second counter within specific the second time zone in the second observation period with a second threshold value set in advance to select a subscriber whose the number of calls exceeds the second threshold value as a target whose traffic within a third time zone shorter than the second time zone is to be observed, and a third step of setting a third observation period after the second observation period with respect to each of the plurality of selected subscribers to be observed and storing the number of calls of each subscriber within the third time zone in a third counter.

According to the second aspect of the invention, a subscriber's busy hour detection system for observing traffic of a subscriber of a communication line in a telecommunication system to detect a subscriber's busy hour, comprises a first step of setting a plurality of observation days as a first observation period with respect to each of a plurality of subscribers to be observed and storing the number of calls of each of the subscribers on each observation day in a day counter, and comparing the number of calls in the day counter with a day threshold value preset in advance to select a subscriber whose the number of calls exceeds the day threshold value as a target whose per hour traffic is to be observed, a second step of setting a plurality of observation days as a second observation period after the first observation period with respect to each of the plurality of selected subscribers to be observed and storing the number of calls of each of the subscribers in each hour on each observation day in an hour counter, and comparing the number of calls in the hour counter with an hour threshold value set in advance to select a subscriber whose the number of calls exceeds the hour threshold value as a subscriber whose per unit of minutes traffic is to be observed, and a third step of setting a plurality of observation days as a third observation period after the second observation period with respect to each of the plurality of selected subscribers to be observed and storing the number of calls of each of the subscribers in each unit of minutes on each observation day in a unit of minutes counter.

In the preferred construction, at the first step, used as the number of calls in the day counter to be compared with the day threshold value is a mean value per day of the plurality of observation days as the first observation period.

In another preferred construction, at the second step, used as the number of calls in the hour counter to be compared with the hour threshold value is a mean value per hour in the total hours of the plurality of observation days as the second observation period.

In another preferred construction, at the first step, used as the number of calls in the day counter to be compared with the day threshold value is a mean value per day of the plurality of observation days as the first observation period, and at the second step, used as the number of calls in the hour counter to be compared with the hour threshold value is a mean value per hour in the total hours of the plurality of observation days as the second observation period.

In another preferred construction, the subscriber's busy hour detection system further comprising in place of the third step:

a fourth step of setting a plurality of observation days as a third observation period after the second observation period with respect to each of the plurality of selected subscribers to be observed and storing the number of calls of each of the subscribers in each unit of minutes on each observation day in a unit of minutes counter, and comparing the number of calls in the unit of minutes counter with a unit of minutes threshold value set in advance to select a subscriber whose the number of calls exceeds the unit of minutes threshold value as a target whose per unit of seconds traffic is to be observed, and the fifth step of setting a plurality of observation days as a fourth observation period after the third observation period with respect to each of the plurality of selected subscribers to be observed and storing the number of calls of each of the subscribers in each unit of seconds within an arbitrary period on each observation day in a unit of seconds counter.

In another preferred construction, at the first step, used as the number of calls in the day counter to be compared with the day threshold value is a mean value per day of the plurality of observation days as the first observation period, and which further comprises in place of the third step:

a fourth step of setting a plurality of observation days as a third observation period after the second observation period with respect to each of the plurality of selected subscribers to be observed and storing the number of calls of each of the subscribers in each unit of minutes on each observation day in a unit of minutes counter, and comparing the number of calls in the unit of minutes counter with a unit of minutes threshold value set in advance to select a subscriber whose the number of calls exceeds the unit of minutes threshold value as a target whose per unit of seconds traffic is to be observed, and the fifth step of setting a plurality of observation days as a fourth observation period after the third observation period with respect to each of the plurality of selected subscribers to be observed and storing the number of calls of each of the subscribers in each unit of seconds within an arbitrary period on each observation day in a unit of seconds counter.

In another preferred construction, at the second step, used as the number of calls in the hour counter to be compared with the hour threshold value is a mean value per hour in the total hours of the plurality of observation days as the second observation period, and which further comprises in place of the third step:

a fourth step of setting a plurality of observation days as a third observation period after the second observation period with respect to each of the plurality of selected subscribers to be observed and storing the number of calls of each of the subscribers in each unit of minutes on each observation day in a unit of minutes counter, and comparing the number of calls in the unit of minutes counter with a unit of minutes threshold value set in advance to select a subscriber whose the number of calls exceeds the unit of minutes threshold value as a target whose per unit of seconds traffic is to be observed, and a fifth step of setting a plurality of observation days as a fourth observation period after the third observation period with respect to each of the plurality of selected subscribers to be observed and storing the number of calls of each of the subscribers in each unit of seconds within an arbitrary period on each observation day in a unit of seconds counter.

In another preferred construction, at the first step, used as the number of calls in the day counter to be compared with the day threshold value is a mean value per day of the plurality of observation days as the first observation period, and at the second step, used as the number of calls in the hour counter to be compared with the hour threshold value is a mean value per hour in the total hours of the plurality of observation days as the second observation period, and which further comprises in place of the third step:

a fourth step of setting a plurality of observation days as a third observation period after the second observation period with respect to each of the plurality of selected subscribers to be observed and storing the number of calls of each of the subscribers in each unit of minutes on each observation day in a unit of minutes counter, and comparing the number of calls in the unit of minutes counter with a unit of minutes threshold value set in advance to select a subscriber whose the number of calls exceeds the unit of minutes threshold value as a target whose per unit of seconds traffic is to be observed, and a fifth step of setting a plurality of observation days as a fourth observation period after the third observation period with respect to each of the plurality of selected subscribers to be observed and storing the number of calls of each of the subscribers in each unit of seconds within an arbitrary period on each observation day in a unit of seconds counter.

In another preferred construction, used as the number of calls is the number of terminating calls including an incomplete call.

According to the third aspect of the invention, a subscriber's busy hour detection device for use in a subscriber's busy hour detection system for observing traffic of a subscriber of a communication line in a telecommunication system to detect a subscriber's busy hour, comprises a day counter provided corresponding to each of a plurality of subscribers to be observed which stores the number of calls on each of a plurality of observation days as a first observation period, a day threshold value setting memory in which a day threshold value to be compared with the number of calls in the day counter is set in order to select a subscriber whose per hour traffic is to be observed from among the subscribers to be observed, an hour counter provided corresponding to each of the plurality of subscribers to be observed who are selected as targets whose per hour traffic is to be observed which stores the number of calls in each hour of a plurality of observation hours as a second observation period after the first observation period, an hourthreshold value setting memory in which an hour threshold value to be compared with the number of calls in the hour counter is set in order to select a subscriber whose per unit of minutes traffic is to be observed from among the subscribers whose per hour traffic is to be observed, and a minute counter provided corresponding to each of the subscribers whose per unit of minutes traffic is to be observed which stores the number of calls in each unit of minutes on each of a plurality of observation days as a third observation period after the second observation period.

In the preferred construction, the subscriber's busy hour detection device further comprises a plurality of subscriber registration tables corresponding to subscribers for registering the subscribers to be observed.

In another preferred construction, the subscriber's busy hour detection device further comprises a plurality of observation day registration tables corresponding to observation days for registering the observation days.

In another preferred construction, the subscriber's busy hour detection device further comprises a plurality of subscriber registration tables corresponding to subscribers for registering the subscribers to be observed, and a plurality of observation day registration tables corresponding to observation days for registering the observation days.

According to another aspect of the invention, a subscriber's busy hour detection device for use in a subscriber's busy hour detection system for observing traffic of a subscriber of a communication line in a telecommunication system to detect a subscriber's busy hour, comprises a day counting means provided corresponding to each of a plurality of subscribers to be observed for storing the number of calls on each of a plurality of observation days as a first observation period, a day threshold value setting means for setting a day threshold value to be compared with the number of calls in the day counter in order to select a subscriber whose per hour traffic is to be observed from among the subscribers to be observed, an hour counting means provided corresponding to each of the plurality of subscribers to be observed who are selected as targets whose per hour traffic is to be observed for storing the number of calls in each hour of a plurality of observation hours as a second observation period after the first observation period, an hourthreshold value setting means for setting an hour threshold value to be compared with the number of calls in the hour counter in order to select a subscriber whose per unit of minutes traffic is to be observed from among the subscribers whose per hour traffic is to be observed, and a minute counting provided corresponding to each of the subscribers whose per unit of minutes traffic is to be observed for storing the number of calls in each unit of minutes on each of a plurality of observation days as a third observation period after the second observation period.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 3 is a diagram showing a structure of the contents of main components of the electronic switching system;

FIG. 4 is a diagram showing a structure of the contents of main components of the electronic switching system;

FIG. 5 is a flow chart for use in explaining an operation procedure of the subscriber's busy hour detection system;

FIG. 6 is a flow chart for use in explaining an operation procedure of the subscriber's busy hour detection system;

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
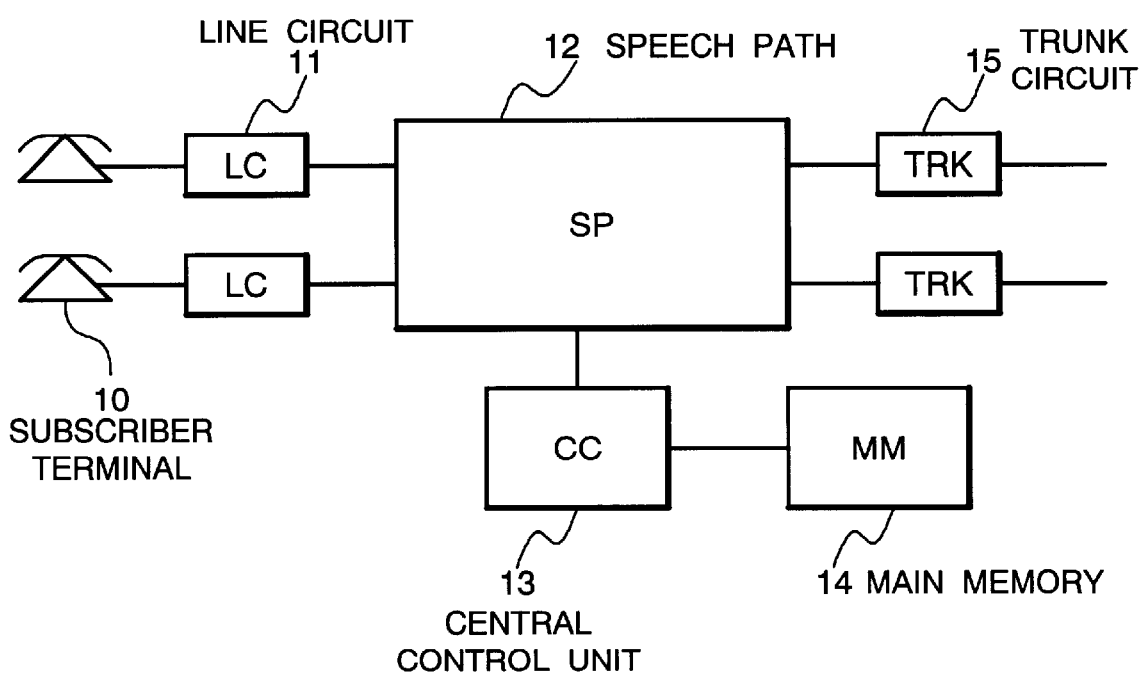
FIG. 1 is a block diagram showing a structure of an electronic switching system for use in a subscriber's busy hour detection system as one embodiment of the present invention.
Figure 2:
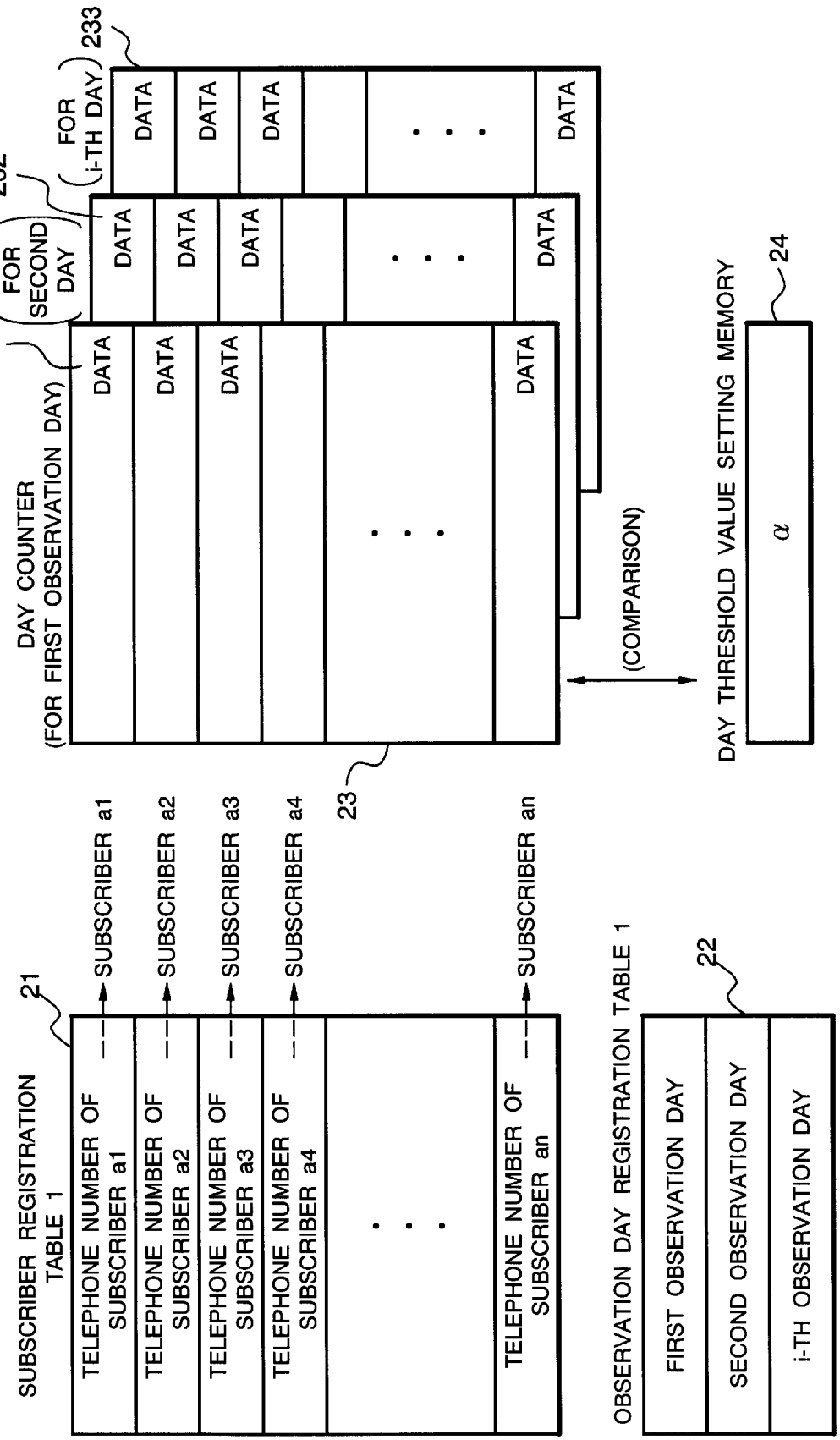
FIG. 2 is a diagram showing a structure of the contents of main components of the electronic switching system.

FIG. 1 is a block diagram showing a structure of an electronic switching system for use in a subscriber's busy hour detection system as one embodiment of the present invention, FIGS. 2 to 4 are diagrams showing a structure of the contents of main components of the electronic switching system, and FIGS. 5 to 12 are flow charts for use in explaining an operation procedure of the subscriber's busy hour detection system.

In the electronic switching system for use in the subscriber's busy hour detection system in this example, as illustrated in FIG. 1, a plurality of subscriber terminals 10 are connected to a part of a speech path (SP) 12 through line circuits (LC) 11, respectively, and the remaining part of the speech path 12 is connected to a trunk circuit (TRK) 15. Also connected to the speech path 12 is a central control unit (CC) 13 to which a main memory (MM) 14 is connected where data and programs are stored as will be described later.

Stored in the main memory 14 is a hierarchical data structure on the basis of a unit of time for observing traffic of each subscriber in order to execute the subscriber's busy hour detection system of this example. Here, the time-basis hierarchical data structure is composed of, for example, three stages, the first-stage data where "day-basis" subscriber data is stored, the second-stage data where "hour-basis" subscriber data is stored and the third-stage data where "minute-basis" subscriber data is stored.

In this example, the description will be made with respect to a case where as the contents of the number of calls, only the number of terminating calls including an incomplete call is collected as data.

In the main memory 14, as illustrated in FIG. 2, "day-basis" information is stored relating to a subscriber to be observed, and a subscriber registration table 1.21, an observation day registration table 1.22, a day counter 23 and a day threshold value setting memory 24 are provided.

In the subscriber registration table 1.21, telephone numbers Ta1, Ta2, Ta3, . . . of a plurality of subscribers a1, a2, a3 . . . to be observed which are selected in advance are sequentially input and registered. Similarly, in the observation day registration table 1.22, a plurality of observation days designated as the first observation period in which the number of terminating calls on each day is obtained are sequentially input and registered. Selected as these observation days are, for example, three successive days excluding a holiday. In the day threshold value setting memory 24, a day threshold value (α) set in advance is input and stored.

The day counter 23 is provided with three storage units 231, 232 and 233 corresponding to observation days (e.g. the above-described three days in the first observation period) each of which storage units is structured to have a plurality of divisional lines corresponding to the respective subscribers where the number of terminating calls (the number of calls) of each subscriber on each observation day is sequentially stored as data. For example, stored in the uppermost line of the storage unit 231 is the number of terminating calls of the subscriber a1 on the first day, stored in the uppermost line of the storage unit 232 is the number of terminating calls of the subscriber a1 on the second day and stored in the uppermost line of the storage unit 233 is the number of terminating calls of the subscriber a1 on the third day.

In the main memory 14, as illustrated in FIG. 3, "hour-basis" information is stored with respect to a subscriber to be observed, and a subscriber registration table 2.31, an observation day registration table 2.32, an hour counter 33 and an hour threshold value setting memory 34 are provided.

In the observation day registration table 2.32, a plurality of observation days (the subsequent observation days) designated as the second observation period in which the number of terminating calls per day is obtained are sequentially input and registered. Selected as these observation days are, for example, three successive days excluding a holiday which follow the above-described three days. In the hour threshold value setting memory 34, a threshold (β) for each hour set in advance is input and stored.

Sequentially input and registered in the subscriber registration table 2.31 are telephone numbers Tb1, Tb2, Tb3, . . . of a plurality of subscribers b1, b2, b3, . . . to be observed which are selected, based on the comparison conducted by program processing at a time when observation of the above-described three days is completed between a mean value for a day of a total sum of terminating calls which is data stored in the day counter 23 and the day threshold value (α) in the day threshold value setting memory 24, as a plurality of subscribers whose mean value is larger than the day threshold value (α) as targets whose per hour traffic is to be observed.

The hour counter 33, similarly to FIG. 2, is provided with three storage units corresponding to observation days (e.g. the above-described three days in the second observation period) each of which storage units is structured to have a plurality of divisional lines corresponding to the respective subscribers where the number of terminating calls of each subscriber in each observation hour is sequentially stored as data. For example, stored in a storage unit 331 on the uppermost line of the first day storage unit is the number of terminating calls of the subscriber b1 in an hour (00:00–01:00), stored in a storage unit 332 is the number of terminating calls of the subscriber b1 in the next one hour (01:00–02:00) and stored in a storage unit 333 is the number of terminating calls of the subscriber b1 in another hour (23:00–24:00).

In the main memory 14, as illustrated in FIG. 4, "minute-basis" information is stored with respect to a subscriber to be observed, and a subscriber registration table 3.41, an observation day registration table 3.42, and a five-minutes counter 43 are provided.

In the observation day registration table 3.42, a plurality of observation days (the further subsequent observation days) designated as the third observation period in which the number of terminating calls in every five minutes is obtained are sequentially input and registered. Selected as these observation days are, for example, three successive days excluding a holiday which follow the above-described three days.

Sequentially input and registered in the subscriber registration table 3.41 are telephone numbers Tc1, Tc2, Tc3, . . . of a plurality of subscribers c1, c2, c3, . . . to be observed which are selected, based on the comparison conducted by program processing at a time when observation of the above-described three days is completed between a mean value for an hour of a total sum of terminating calls which is data stored in the hour counter 33 and the hour threshold value (β) in the hour threshold value setting memory 34, as a plurality of subscribers whose mean value is larger than the hour threshold value (β) as targets whose per minute traffic is to be observed.

The five-minutes counter 43, similarly to FIG. 3, is provided with three storage units corresponding to observation days (e.g. the above-described three days in the third observation period) each of which storage units is structured to have a plurality of divisional lines corresponding to the respective subscribers where the number of terminating calls of each subscriber in every five minutes of observation is sequentially stored as data. For example, stored in a storage unit 431 on the uppermost line of the first day storage unit is the number of terminating calls of the subscriber c1 in certain five minutes, stored in a storage unit 432 is the number of terminating calls of the subscriber c1 in the next five minutes and stored in a storage unit 433 is the number of terminating calls of the subscriber c1 in another five minutes.

Accordingly, by obtaining the number of terminating calls of each subscriber in every five minutes on each observation day from the five-minutes counter 43, subscriber's busy hour can be minutely detected.

Next, with reference to the flow chars of FIGS. 5 to 12, operation of the subscriber's busy hour detection system in this example will be described. The operation will be described separately with respect to behavior of a maintenance staff and program operation, and description will be first made of behavior of a maintenance staff with reference to the flow chart of FIG. 5.

(1) Behavior of Maintenance Staff

First, the maintenance staff determines the subscribers a1, a2, a3, . . . to be observed and sequentially inputs the telephone numbers Ta1, Ta2, Ta3, . . . of the target subscribers a1, a2, a3, . . . to the subscriber registration table 1.21 in FIG. 2 as commands (Step S51).

Next, the maintenance staff determines a day threshold value ($\alpha$) and inputs the value to the day threshold value setting memory 24 in FIG. 2 as commands (Step S52).

Next, the maintenance staff determines an hour threshold value ($\beta$) and inputs the value to the hour threshold value setting memory 34 in FIG. 3 as commands (Step S53).

Next, for obtaining the number of terminating calls on each day, the maintenance staff designates, for example, three successive observation days as the first observation period and inputs the days to the observation day registration table 1.22 of FIG. 2 as commands (Step S54).

Next, for obtaining the number of terminating calls in each hour, the maintenance staff designates, for example, three successive observation days as the second observation period and inputs the days to the observation day registration table 2.32 of FIG. 3 as commands (Step S55).

Next, for obtaining the number of terminating calls in every five minutes, the maintenance staff further designates, for example, three successive observation days as the third observation period and inputs the days to the observation day registration table 3.42 of FIG. 4 as commands (Step S56).

Next, the maintenance staff instructs the system to start counting of the number of terminating calls (Step S57).

Through the foregoing procedure, relevant processing (additional processing) of a terminating call analysis program for executing the subscriber's busy hour detection system of this example is started. Next, program operation procedure will be described based on the flow charts of FIGS. 6 to 12.

(2) Program Operation

First, as illustrated in FIG. 6, in response to such command input by a maintenance staff as described above, first secure areas of the day counter 23 within the main memory 14 according to the number of a plurality of observation days as the first observation period (Step S61).

Next, secure areas of the hour counter 33 within the main memory 14 according to the number of a plurality of observation days as the second observation period (Step S62).

Next, secure areas of the five-minutes counter 43 within the main memory 14 according to the number of a plurality of observation days as the third observation period (Step S63).

Subsequently, initialize each area of the above-described respective counters 23, 33 and 43 (Step S64).

The foregoing procedure activates the additional processing in the terminating call analysis program. In the following, processing of the day terminating call counter, the hour terminating call counter and the five-minutes counter will be described in order with respect to Step 1, Step 2 and Step 3, respectively.

Step 1 (Processing of Day Terminating Call Counter)

Figure 7:
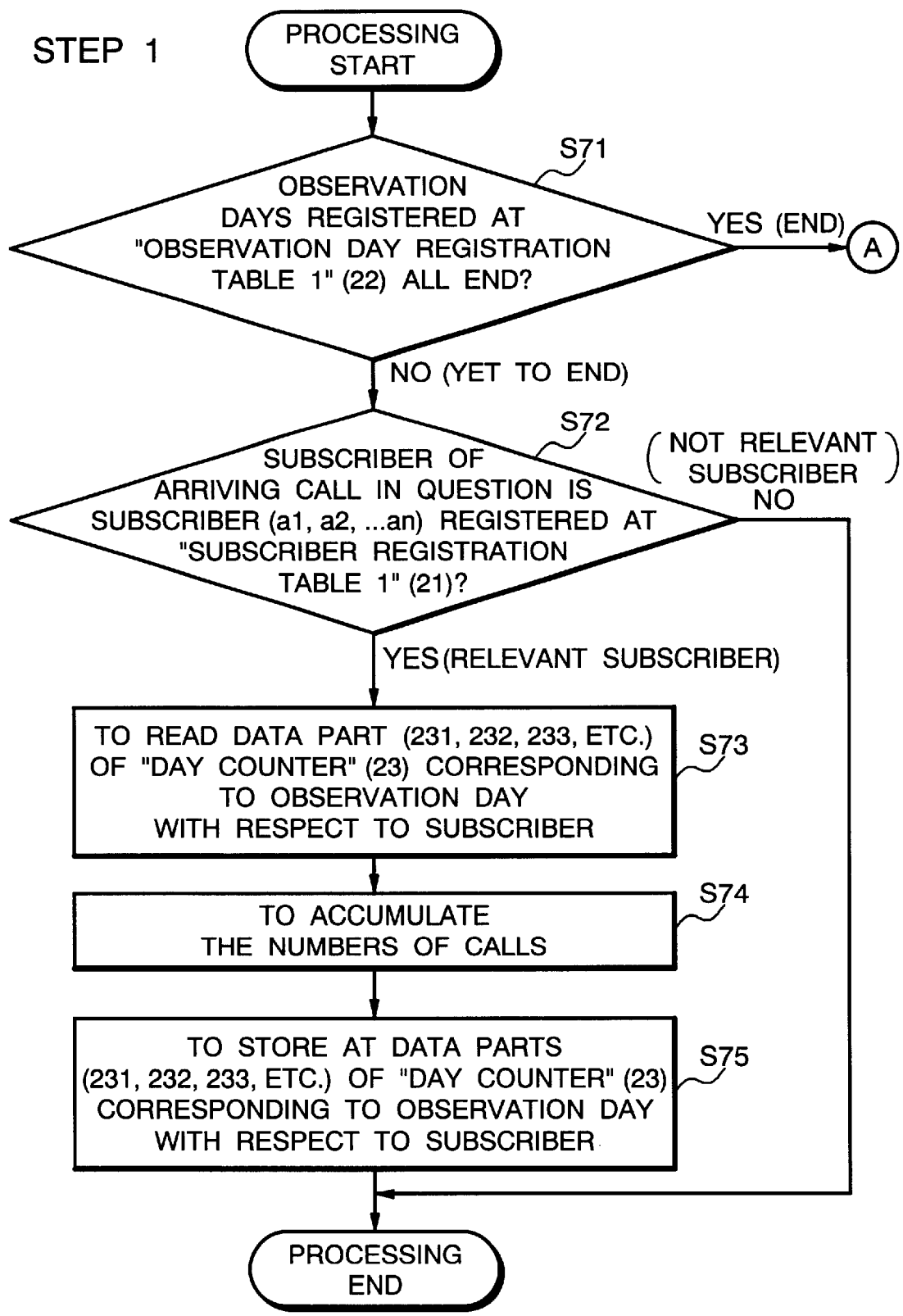
FIG. 7 is a flow chart for use in explaining an operation procedure of the subscriber's busy hour detection system.

As illustrated in FIG. 7, when the terminating call analysis program is activated by an in-station connection call or an incoming connection call, first check whether the observation days registered at the observation day registration table 1.22 all end or not (Step S71).

When all the observation days end, the flow proceeds to Step S81. On the other hand, when not all the observation days end, check whether the subscriber of the terminating call in question is a subscriber registered at the subscriber registration table 1.21, that is, a subscriber to be observed (Step S72).

When the subscriber in question is not a subscriber to be observed, that is, when the subscriber is not a relevant subscriber, processing ends. When the subscriber is a subscriber to be observed, read data of the storage units 231–233 etc. of the day counter 23 corresponding to the observation day with respect to the subscriber (Step S73). More specifically, accumulate the numbers of calls to increase the frequency, for example, by one (Step S74).

Next, store the result at the same place from which the data is read, that is, from the storage units 231–233 etc. of the day counter 23 corresponding to the observation day with respect to the subscriber to complete the additional processing of the terminating call analysis program (Step S75).

Figure 8:
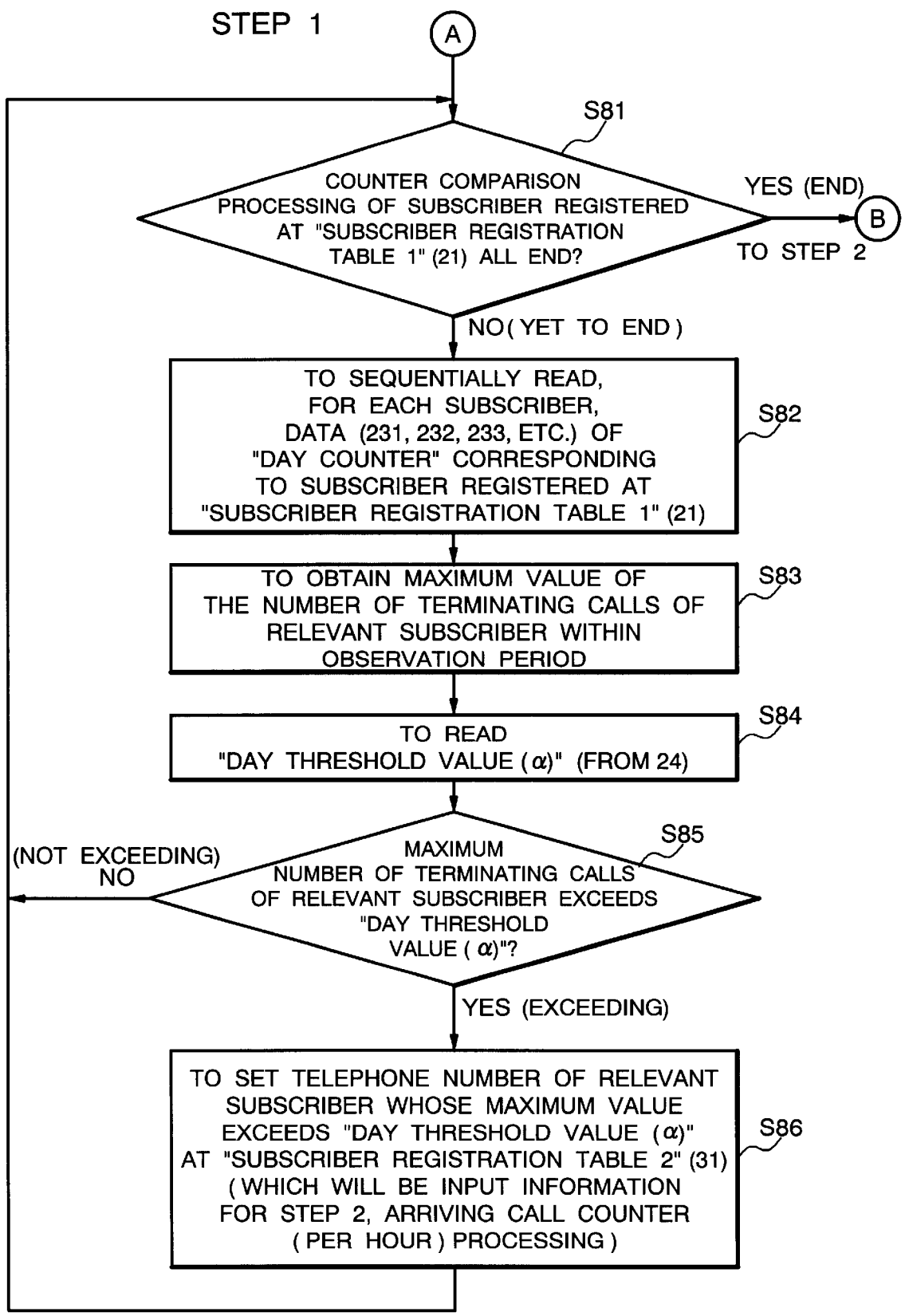
FIG. 8 is a flow chart for use in explaining an operation procedure of the subscriber's busy hour detection system.

When at the processing at Step S71, all the observation days registered at the observation day registration table 1.22 end, the flow proceeds to the processing shown in FIG. 8.

Next, with respect to every subscriber registered at the subscriber registration table 1.21, check whether counter comparison processing is completed. When the processing is completed for all the subscribers, the flow shifts to Step 2 which will be described later.

When the processing is not completed, sequentially read, for each subscriber, data from the storage units 231–233 etc. of the day counter 23 corresponding to the subscribers registered at the subscriber registration table 1.21 (Step S82).

Next, read the day threshold value ($\alpha$) from the day threshold value setting memory 24 (Step S84).

Then check whether the maximum value of the number of terminating calls of the subscriber in question exceeds the day threshold value ($\alpha$) (Step S85). When it fails to exceed the value, the flow shifts to the processing of the next subscriber. When it exceeds the value, set the telephone number of the subscriber in question at the subscriber registration table 2.31 (Step S86). The above-described information will be input information at the subsequent Step 2. Here, the series of processing at Steps S82–S86 in FIG. 8 is in general handled as another program processing through a queue.

Step 2 (Processing of Hour Terminating Call Counter)

Figure 9:
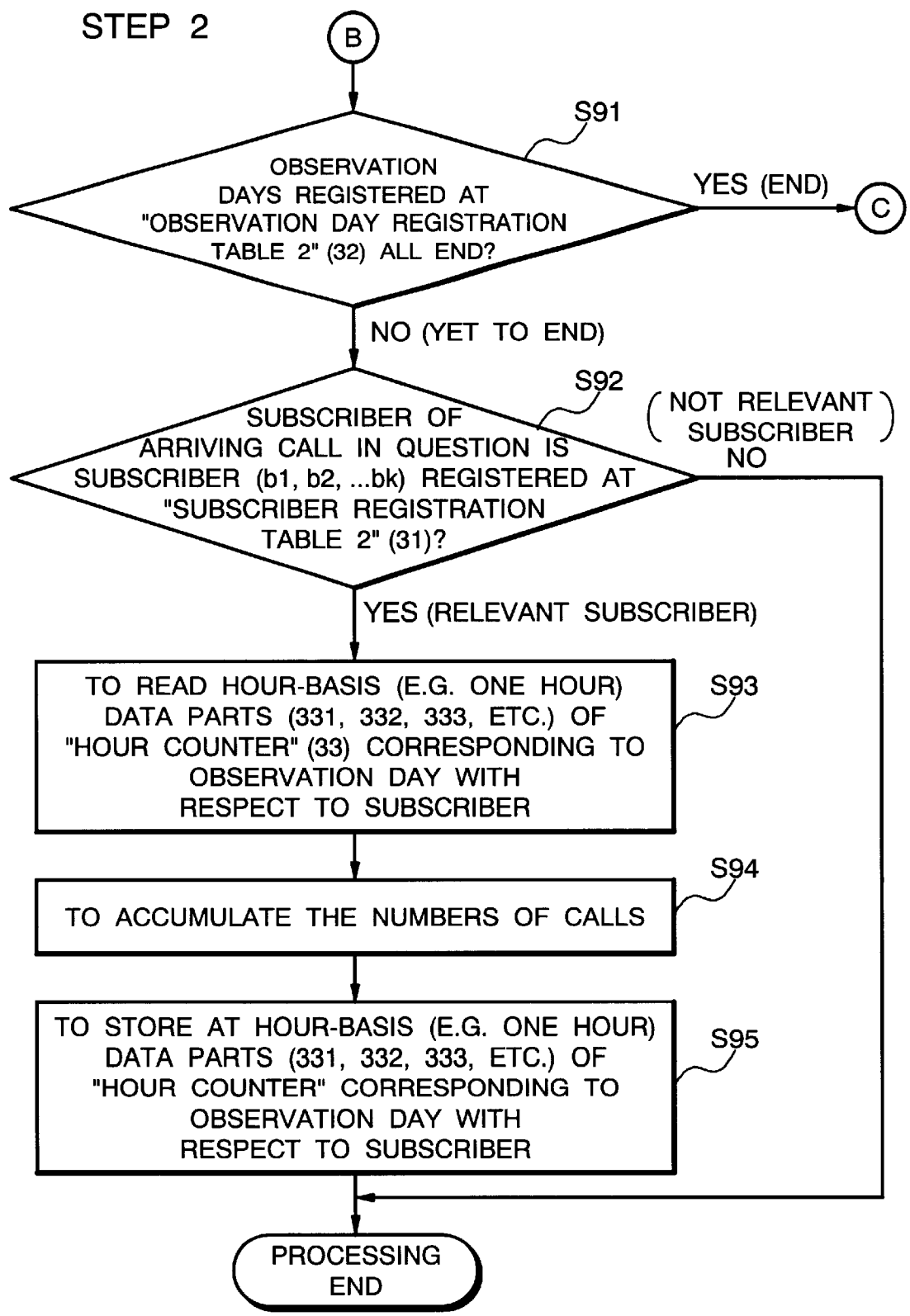
FIG. 9 is a flow chart for use in explaining an operation procedure of the subscriber's busy hour detection system.

As illustrated in FIG. 9, check whether the observation days registered at the observation day registration table 2.32 all end or not (Step S91).

When all the observation days end, the flow shifts to Step S101. On the other hand, when not all the observation days end, check whether the subscriber of the terminating call in question is a subscriber registered at the subscriber registration table 2.31, that is, a subscriber to be observed (Step S92).

When the subscriber in question is not a subscriber to be observed, that is, when the subscriber is not a relevant subscriber, processing ends. When the subscriber is a subscriber to be observed, read data of the storage units 331–333 etc. of the hour counter 33 corresponding to the observation day with respect to the subscriber (Step S93). More specifically, accumulate the numbers of calls to increase the frequency, for example, by one (Step S94).

Next, store the result at the same place from which the data is read, that is, from the storage units 331–333 etc. of the hour counter 33 corresponding to the observation day with respect to the subscriber to complete the additional processing of the terminating call analysis program (Step S95).

Figure 10:
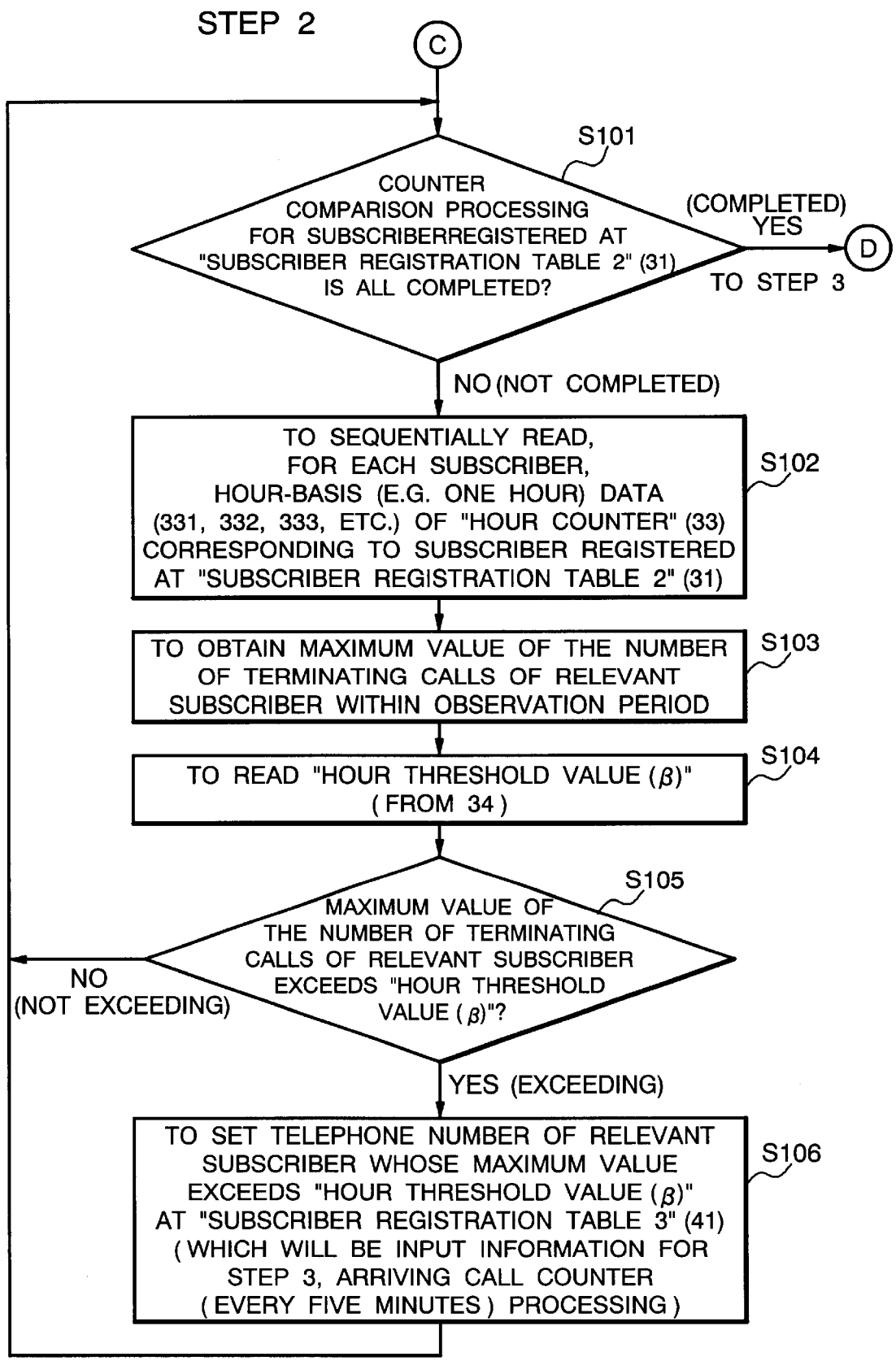
FIG. 10 is a flow chart for use in explaining an operation procedure of the subscriber's busy hour detection system.

When at the processing at Step S91, all the observation days registered at the observation day registration table 2.32 end, the flow shifts to the processing shown in FIG. 10.

Next, with respect to every subscriber registered at the subscriber registration table 2.31, check whether counter comparison processing is completed. When the processing is completed for all the subscribers, the flow shifts to Step 3 which will be described later.

When the processing is not completed, sequentially read, for each subscriber, data from the storage units 331–333 etc. of the hour counter 33 corresponding to the subscribers registered at the subscriber registration table 2.31 (Step S102). Next, calculate a maximum value of the subscriber in question within the observation day period (Step S103). Next, read the hour threshold value ($\beta$) from the hour threshold value setting memory 34 (Step S104).

Then check whether the maximum value of the number of terminating calls of the subscriber in question exceeds the hour threshold value ($\beta$) (Step S105).

When it fails to exceed the value, the flow proceeds to the processing of the next subscriber. When it exceeds the value, set the telephone number of the subscriber in question at the subscriber registration table 3.41 (Step S106). The above-described information will be input information at the subsequent Step 3.

Here, the series of processing at Steps S102–S106 in FIG. 10 is in general handled as another program processing through a queue.

Step 3 (Processing of Every Five Minutes Terminating Call counter)

Figure 11:
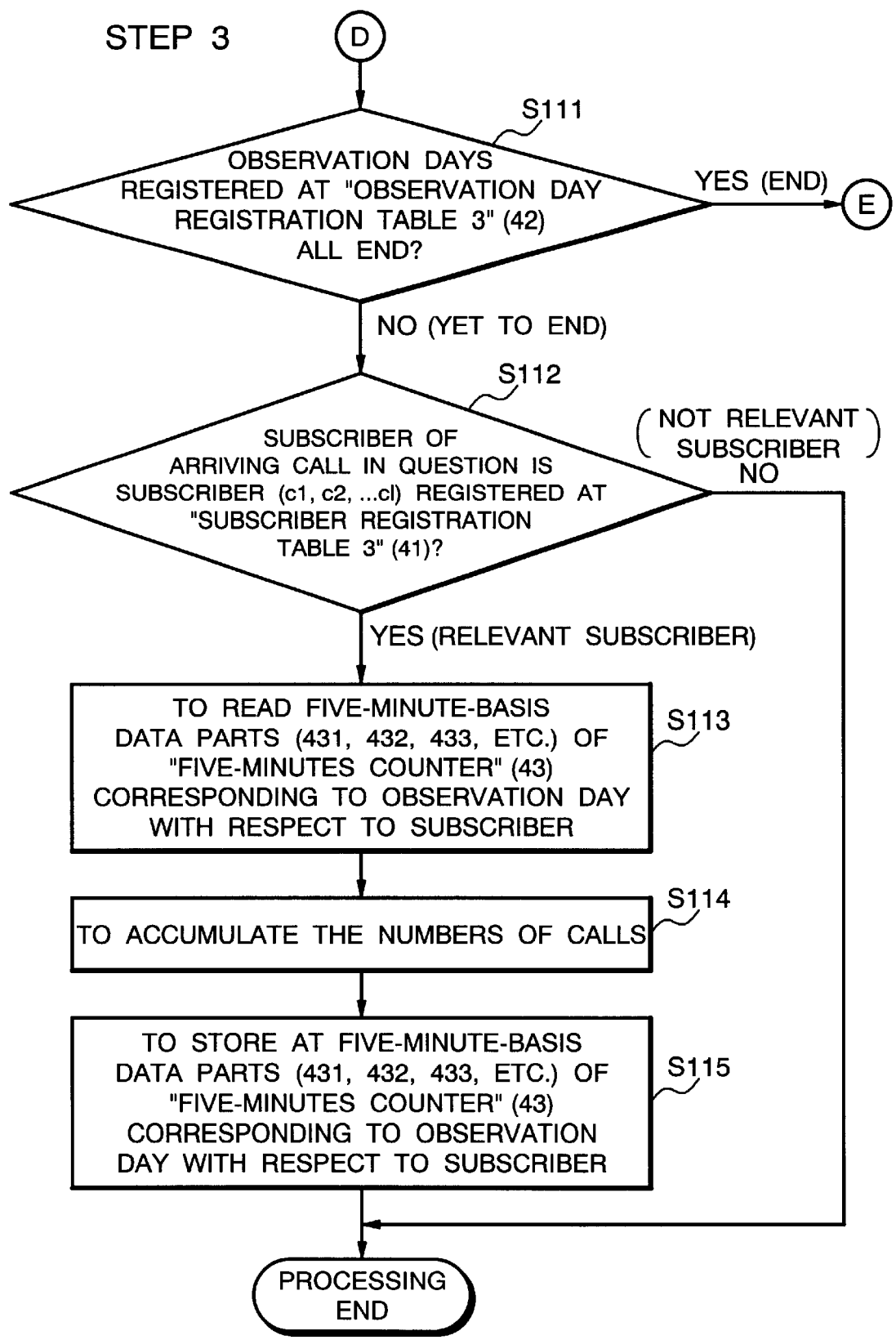
FIG. 11 is a flow chart for use in explaining an operation procedure of the subscriber's busy hour detection system.

As illustrated in FIG. 11, check whether the observation days registered at the observation day registration table 3.42 all end or not (Step S111).

When all the observation days end, the flow proceeds to Step S121. On the other hand, when not all the observation days end, check whether the subscriber of the terminating call in question is a subscriber registered at the subscriber registration table 3.41, that is, a subscriber to be observed (Step S112).

When the subscriber in question is not a subscriber to be observed, that is, when the subscriber is not a relevant subscriber, processing ends. When the subscriber is a subscriber to be observed, read data of the storage units 431–433 etc. of the five-minutes counter 43 corresponding to the observation day with respect to the subscriber (Step S113). More specifically, accumulate the numbers of calls to increase the frequency, for example, by one (Step S114).

Next, store the result at the same place from which the data is read, that is, from the storage units 431–433 etc. of the five-minutes counter 43 corresponding to the observation day with respect to the subscriber to complete the additional processing of the terminating call analysis program (Step S115).

Figure 12:
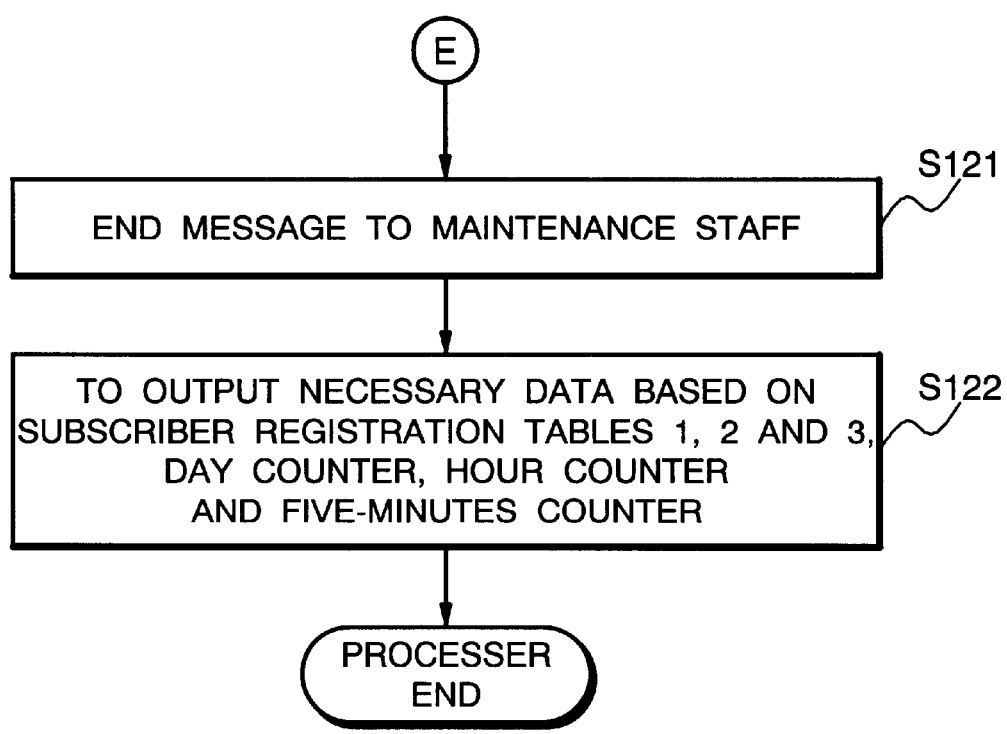
FIG. 12 is a flow chart for use in explaining an operation procedure of the subscriber's busy hour detection system.

When at the processing at Step S111, all the observation days registered at the observation day registration table 3.42 end, the flow proceeds to the processing shown in FIG. 12.

Next, issue an end message to the maintenance staff as shown in FIG. 12 (Step S121).

Next, output necessary data based on the subscriber registration table 1.21, the subscriber registration table 2.31, the subscriber registration table 3.31, the day counter 23, the hour counter 33 and the five-minutes counter 43 (Step S122).

Here, the series of processing at Steps S121 and 122 in FIG. 12 is in general handled as another program processing through a queue.

As described above, according to the structure of this example, since the subscriber's busy hour detection system is designed to be executed through the first stage of setting a plurality of observation days as the first observation period with respect to a plurality of subscribers a1, a2, a3, . . . to be observed who are selected in advance and storing the number of calls of each of the subscribers a1, a2, a3, . . . on each observation day at the day counter 23, and comparing the number of calls in the day counter 23 with a day threshold value ($\alpha$) set in advance to select a subscriber whose number of calls exceeds the day threshold value ($\alpha$) as a subscriber whose per hour traffic is to be observed, the second stage of setting a plurality of observation days as the second observation period after the first observation period with respect to a plurality of selected subscribers b1, b2, b3 . . . to be observed and storing the number of calls of each of the subscribers b1, b2, b3, . . . in each hour on each observation day at the hour counter 33, and comparing the number of calls in the hour counter 33 with an hour threshold value ($\beta$) set in advance to select a subscriber whose number of calls exceeds the hour threshold value ($\beta$) as a subscriber whose every five-minutes traffic is to be observed, and the third stage of setting a plurality of observation days as the third observation period after the second observation period with respect to a plurality of selected subscribers c1, c2, c3, . . . to be observed and storing the number of calls of each of the subscribers c1, c2 and c3, . . . in every five minutes on each observation day at the five-minutes counter 43, the number of subscribers to be observed from which data is to be obtained can be sequentially narrowed down at each stage according to the number of calls.

It is therefore possible to obtain detailed data which reflects a behavior pattern of a subscriber whose life style has been diversified in recent years.

Although the embodiment of the present invention has bee described in detail with reference to the drawings, the specific structure is not limited to that of this embodiment and any modification and the like in design is allowed within the scope of the present invention. For example, although narrowing-down of subscribers to be observed has been described with respect to a case where the ultimate number of calls is stored in the five-minutes counter, five minutes as a value is by way of example only in a minute-basis case and other values such as ten minutes and 15 minutes may be set. When a hold time shorter than a unit of minute is to be observed, a counter of a second, millisecond, etc. shorter than a minute may be provided.

In addition, with further provision of a busy hour registration table which can be retrieved according to subscribers registered at the subscriber registration table of the five-minutes terminating call counter, input of the busy hour of each subscriber obtained in FIG. 3 by program processing or by other method enables calculation of the number of terminating calls in every five minutes only in each subscriber's busy hour (e.g. 10 o'clock in the morning). Moreover, although the embodiment has been described with respect to a case where the processing of comparing the number of terminating calls of a subscriber and a threshold value is incorporated into a terminating call analysis program, this part may be implemented as a program activated at a fixed time. In a case where the part is provided as one step of the terminating call analysis processing, it is a common practice that the relevant part is handled as another internal processing through a queue.

As described above, according to the structure of the present invention, since the subscriber's busy hour detection system is designed to be executed through the first stage of setting a plurality of observation days as the first observation period with respect to a plurality of subscribers to be observed who are selected in advance and storing the number of calls of each subscriber on each observation day in a day counter, and comparing the number of calls in the day counter with a day threshold value set in advance to select a subscriber whose number of calls exceeds the day threshold value as a subscriber whose per hour traffic is to be observed, the second stage of setting a plurality of observation days as the second observation period after the first observation period with respect to a plurality of selected subscribers to be observed and storing the number of calls of each subscriber in each hour on each observation day at an hour counter, and comparing the number of calls in the hour counter with an hour threshold value set in advance to select a subscriber whose number of calls exceeds the hour threshold value as a subscriber whose every minutes traffic is to be observed, and the third stage of setting a plurality of observation days as the third observation period after the second observation period with respect to a plurality of selected subscribers to be observed and storing the number of calls of each subscriber in each unit of minutes on each observation day at a unit of minutes counter, the number of subscribers to be observed from which data is to be obtained can be sequentially narrowed down at each stage according to the number of calls.

Moreover, since the subscriber's busy hour detection device of the present invention is structured to include a day counter for storing the number of calls on each of a plurality of observation days as the first observation period which counter is provided corresponding to each of a plurality of subscribers to be observed, a day threshold value setting memory in which a day threshold value to be compared with the number of calls in the above day counter is set in order to select a subscriber whose per hour traffic is to be observed from among the above subscribers to be observed, an hour counter for storing the number of calls in each of a plurality of observation hours as the second observation period after the above first observation period which counter is provided corresponding to each of the above plurality of subscribers to be observed which are selected as targets whose per hour traffic is to be observed, an hour threshold value setting memory in which an hour threshold value to be compared with the number of calls in the above hour counter is set in order to select a subscriber whose per unit of minutes traffic is to be observed from among the above subscribers whose per hour traffic is to be observed, and a minute counter for storing the number of calls in each unit of minutes on each of a plurality of observation days as the third observation period after the above second observation period which counter is provided corresponding to each of the subscribers whose per unit of minutes traffic is to be observed, subscriber's busy hour can be detected precisely.

It is therefore possible to obtain detailed data which reflects a behavior pattern of a subscriber whose life style has been diversified in recent years.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A subscriber's busy hour detection system for observing traffic of a subscriber of a communication line in a telecommunication system to detect a subscriber's busy hour, comprising:

a first step of setting a first observation period with respect to each of a plurality of subscribers to be observed and comparing the number of calls of each subscriber stored in a first counter within a specific first time zone in the first observation period with a first threshold value set in advance to select a subscriber whose said number of calls exceeds said first threshold value as a target whose traffic within a second time zone shorter than said first time zone is to be observed;

a second step of setting a second observation period after said first observation period with respect to each of said plurality of selected subscribers to be observed and comparing the number of calls of each subscriber stored in a second counter within specific said second time zone in said second observation period with a second threshold value set in advance to select a subscriber whose said number of calls exceeds said second threshold value as a target whose traffic within a third time zone shorter than said second time zone is to be observed; and a third step of setting a third observation period after said second observation period with respect to each of said plurality of selected subscribers to be observed and storing the number of calls of each subscriber within said third time zone in a third counter.

2. A subscriber's busy hour detection system for observing traffic of a subscriber of a communication line in a telecommunication system to detect a subscriber's busy hour, comprising:

a first step of setting a plurality of observation days as a first observation period with respect to each of a plurality of subscribers to be observed and storing the number of calls of each of the subscribers on each observation day in a day counter, and comparing the number of calls in the day counter with a day threshold value preset in advance to select a subscriber whose said number of calls exceeds said day threshold value as a target whose per hour traffic is to be observed;

a second step of setting a plurality of observation days as a second observation period after said first observation period with respect to each of said plurality of selected subscribers to be observed and storing the number of calls of each of the subscribers in each hour on each observation day in an hour counter, and comparing the number of calls in the hour counter with an hour threshold value set in advance to select a subscriber whose said number of calls exceeds said hour threshold value as a subscriber whose per unit of minutes traffic is to be observed; and a third step of setting a plurality of observation days as a third observation period after said second observation period with respect to each of said plurality of selected subscribers to be observed and storing the number of calls of each of the subscribers in each unit of minutes on each observation day in a unit of minutes counter.

3. The subscriber's busy hour detection system as set forth in claim 2, wherein at said first step, used as the number of calls in said day counter to be compared with said day threshold value is a mean value per day of the plurality of observation days as said first observation period.

4. The subscriber's busy hour detection system as set forth in claim 2, wherein
   at said second step, used as the number of calls in said hour counter to be compared with said hour threshold value is a mean value per hour in the total hours of the plurality of observation days as said second observation period.

5. The subscriber's busy hour detection system as set forth in claim 2, wherein
   at said first step, used as the number of calls in said day counter to be compared with said day threshold value is a mean value per day of the plurality of observation days as said first observation period, and
   at said second step, used as the number of calls in said hour counter to be compared with said hour threshold value is a mean value per hour in the total hours of the plurality of observation days as said second observation period.

6. The subscriber's busy hour detection system as set forth in claim 2, further comprising in place of said third step:
   a fourth step of setting a plurality of observation days as a third observation period after said second observation period with respect to each of said plurality of selected subscribers to be observed and storing the number of calls of each of the subscribers in each unit of minutes on each observation day in a unit of minutes counter, and comparing the number of calls in the unit of minutes counter with a unit of minutes threshold value set in advance to select a subscriber whose said number of calls exceeds said unit of minutes threshold value as a target whose per unit of seconds traffic is to be observed, and the fifth step of setting a plurality of observation days as a fourth observation period after said third observation period with respect to each of said plurality of selected subscribers to be observed and storing the number of calls of each of the subscribers in each unit of seconds within an arbitrary period on each observation day in a unit of seconds counter.

7. The subscriber's busy hour detection system as set forth in claim 2, wherein
   at said first step, used as the number of calls in said day counter to be compared with said day threshold value is a mean value per day of the plurality of observation days as said first observation period, and
   which further comprises in place of said third step:
   a fourth step of setting a plurality of observation days as a third observation period after said second observation period with respect to each of said plurality of selected subscribers to be observed and storing the number of calls of each of the subscribers in each unit of minutes on each observation day in a unit of minutes counter, and comparing the number of calls in the unit of minutes counter with a unit of minutes threshold value set in advance to select a subscriber whose said number of calls exceeds said unit of minutes threshold value as a target whose per unit of seconds traffic is to be observed, and the fifth step of setting a plurality of observation days as a fourth observation period after said third observation period with respect to each of said plurality of selected subscribers to be observed and storing the number of calls of each of the subscribers in each unit of seconds within an arbitrary period on each observation day in a unit of seconds counter.

8. The subscriber's busy hour detection system as set forth in claim 2, wherein
   at said second step, used as the number of calls in said hour counter to be compared with said hour threshold value is a mean value per hour in the total hours of the plurality of observation days as said second observation period, and
   which further comprises in place of said third step:
   a fourth step of setting a plurality of observation days as a third observation period after said second observation period with respect to each of said plurality of selected subscribers to be observed and storing the number of calls of each of the subscribers in each unit of minutes on each observation day in a unit of minutes counter, and comparing the number of calls in the unit of minutes counter with a unit of minutes threshold value set in advance to select a subscriber whose said number of calls exceeds said unit of minutes threshold value as a target whose per unit of seconds traffic is to be observed, and
   a fifth step of setting a plurality of observation days as a fourth observation period after said third observation period with respect to each of said plurality of selected subscribers to be observed and storing the number of calls of each of the subscribers in each unit of seconds within an arbitrary period on each observation day in a unit of seconds counter.

9. The subscriber's busy hour detection system as set forth in claim 2, wherein
   at said first step, used as the number of calls in said day counter to be compared with said day threshold value is a mean value per day of the plurality of observation days as said first observation period, and
   at said second step, used as the number of calls in said hour counter to be compared with said hour threshold value is a mean value per hour in the total hours of the plurality of observation days as said second observation period, and
   which further comprises in place of said third step:
   a fourth step of setting a plurality of observation days as a third observation period after said second observation period with respect to each of said plurality of selected subscribers to be observed and storing the number of calls of each of the subscribers in each unit of minutes on each observation day in a unit of minutes counter, and comparing the number of calls in the unit of minutes counter with a unit of minutes threshold value set in advance to select a subscriber whose said number of calls exceeds said unit of minutes threshold value as a target whose per unit of seconds traffic is to be observed, and
   a fifth step of setting a plurality of observation days as a fourth observation period after said third observation period with respect to each of said plurality of selected subscribers to be observed and storing the number of calls of each of the subscribers in each unit of seconds within an arbitrary period on each observation day in a unit of seconds counter.

10. The subscriber's busy hour detection system according to claim 2, wherein
    used as said number of calls is the number of terminating calls including an incomplete call.

11. A subscriber's busy hour detection device for use in a subscriber's busy hour detection system for observing traffic of a subscriber of a communication line in a telecommunication system to detect a subscriber's busy hour, comprising:
    a day counter provided corresponding to each of a plurality of subscribers to be observed which stores the number of calls on each of a plurality of observation days as a first observation period;

a day threshold value setting memory in which a day threshold value to be compared with the number of calls in said day counter is set in order to select a subscriber whose per hour traffic is to be observed from among said subscribers to be observed;

an hour counter provided corresponding to each of said plurality of subscribers to be observed who are selected as targets whose per hour traffic is to be observed which stores the number of calls in each hour of a plurality of observation hours as a second observation period after said first observation period;

an hourthreshold value setting memory in which an hour threshold value to be compared with the number of calls in said hour counter is set in order to select a subscriber whose per unit of minutes traffic is to be observed from among said subscribers whose per hour traffic is to be observed; and a minute counter provided corresponding to each of said subscribers whose per unit of minutes traffic is to be observed which stores the number of calls in each unit of minutes on each of a plurality of observation days as a third observation period after said second observation period.

12. The subscriber's busy hour detection device as set forth in claim 11, further comprising a plurality of subscriber registration tables corresponding to subscribers for registering said subscribers to be observed.

13. The subscriber's busy hour detection device as set forth in claim 11, further comprising
a plurality of observation day registration tables corresponding to observation days for registering said observation days.

14. The subscriber's busy hour detection device as set forth in claim 11, further comprising:
a plurality of subscriber registration tables corresponding to subscribers for registering said subscribers to be observed, and
a plurality of observation day registration tables corresponding to observation days for registering said observation days.

15. A subscriber's busy hour detection device for use in a subscriber's busy hour detection system for observing traffic of a subscriber of a communication line in a telecommunication system to detect a subscriber's busy hour, comprising:
a day counting means provided corresponding to each of a plurality of subscribers to be observed for storing the number of calls on each of a plurality of observation days as a first observation period;

a day threshold value setting means for setting a day threshold value to be compared with the number of calls in said day counter in order to select a subscriber whose per hour traffic is to be observed from among said subscribers to be observed;

an hour counting means provided corresponding to each of said plurality of subscribers to be observed who are selected as targets whose per hour traffic is to be observed for storing the number of calls in each hour of a plurality of observation hours as a second observation period after said first observation period;

an hourthreshold value setting means for setting an hour threshold value to be compared with the number of calls in said hour counter in order to select a subscriber whose per unit of minutes traffic is to be observed from among said subscribers whose per hour traffic is to be observed; and a minute counting provided corresponding to each of said subscribers whose per unit of minutes traffic is to be observed for storing the number of calls in each unit of minutes on each of a plurality of observation days as a third observation period after said second observation period.

16. The subscriber's busy hour detection device as set forth in claim 15, further comprising
a plurality of subscriber registration tables corresponding to subscribers for registering said subscribers to be observed.

17. The subscriber's busy hour detection device as set forth in claim 15, further comprising
a plurality of observation day registration tables corresponding to observation days for registering said observation days.

18. The subscriber's busy hour detection device as set forth in claim 15, further comprising:
a plurality of subscriber registration tables corresponding to subscribers for registering said subscribers to be observed, and
a plurality of observation day registration tables corresponding to observation days for registering said observation days.

* * * * *